US009482584B2

(12) United States Patent
Im et al.

(10) Patent No.: US 9,482,584 B2
(45) Date of Patent: Nov. 1, 2016

(54) SYSTEM AND METHOD FOR PREDICTING THE TEMPERATURE OF A DEVICE

(71) Applicant: SAMSUNG ELECTRONICS CO., LTD., Suwon-si, Gyeonggi-do (KR)

(72) Inventors: Yun-hyeok Im, Hwaseong-si (KR); Kyol Park, Daejeon (KR); Tae-je Cho, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 666 days.

(21) Appl. No.: 13/776,973

(22) Filed: Feb. 26, 2013

(65) Prior Publication Data

US 2013/0259092 A1 Oct. 3, 2013

(30) Foreign Application Priority Data

Mar. 28, 2012 (KR) ........................ 10-2012-0031819

(51) Int. Cl.
*G01K 7/00* (2006.01)
*G01K 7/34* (2006.01)
*G01K 7/16* (2006.01)
*G01K 7/42* (2006.01)

(52) U.S. Cl.
CPC . *G01K 7/34* (2013.01); *G01K 7/16* (2013.01); *G01K 7/42* (2013.01)

(58) Field of Classification Search
USPC ............................................ 374/1, 183, 184
See application file for complete search history.

(56) References Cited

U.S. PATENT DOCUMENTS

| 4,669,025 A * | 5/1987 | Barker, III ............. G05D 23/24 307/117 |
| 5,769,847 A * | 6/1998 | Panescu ................ A61B 18/00 374/E1.005 |
| 7,034,556 B1 * | 4/2006 | Arlow .................. H05B 1/0233 700/297 |
| 7,271,604 B2 | 9/2007 | Reitinger |
| 7,520,669 B2 | 4/2009 | Yazawa et al. |
| 8,478,576 B1 * | 7/2013 | Cameron ............ G06F 17/5036 703/13 |
| 2002/0097541 A1 * | 7/2002 | Wei ........................ H02H 5/044 361/58 |
| 2004/0094844 A1 | 5/2004 | Nishino |

(Continued)

FOREIGN PATENT DOCUMENTS

| JP | 05-036782 | 2/1993 |
| JP | 2002-189602 | 7/2002 |

(Continued)

OTHER PUBLICATIONS

Mircea R. Stan, et al., "Hotspot: A Dynamic Compact Thermal Model at the Processor-Architecture Level," pre-printed submitted to Elsevier Science, Jun. 1, 2003, pp. 1-28.

(Continued)

*Primary Examiner* — Mirellys Jagan
(74) *Attorney, Agent, or Firm* — F. Chau & Associates, LLC

(57) ABSTRACT

A method of predicting a temperature includes operatively coupling a temperature prediction circuit to a device including a semiconductor chip, determining a correlation between a current and voltage of the temperature prediction circuit, and predicting a temperature with respect to power applied to the device using the determined correlation.

13 Claims, 8 Drawing Sheets

(56) References Cited

U.S. PATENT DOCUMENTS

| | | | |
|---|---|---|---|
| 2005/0273208 A1* | 12/2005 | Yazawa | G01K 7/425 700/299 |
| 2006/0164111 A1* | 7/2006 | Lopez | G01K 1/16 324/750.03 |
| 2007/0073510 A1* | 3/2007 | Kerkman | G01K 7/425 702/130 |
| 2007/0168151 A1* | 7/2007 | Kernahan | G01K 7/425 702/132 |
| 2008/0011467 A1* | 1/2008 | Rodarte | G06F 1/206 165/287 |
| 2008/0316570 A1 | 12/2008 | Park et al. | |
| 2009/0161726 A1* | 6/2009 | Miyamoto | G01K 7/42 374/172 |
| 2011/0237001 A1* | 9/2011 | Hasebe | H01L 25/0657 438/4 |
| 2014/0212289 A1* | 7/2014 | Thogersen | G01K 7/01 416/146 R |

FOREIGN PATENT DOCUMENTS

| | | |
|---|---|---|
| JP | 2003-108268 | 4/2003 |
| JP | 2003-273447 | 9/2003 |
| JP | 2009-059418 | 3/2009 |
| KR | 100845581 | 7/2008 |
| KR | 1020100054669 | 5/2010 |
| KR | 1020100081622 | 7/2010 |

OTHER PUBLICATIONS

JEDEC Standard, Transient Dual Interface Test Method for the Measurement of the Thermal Resistance Junction to Case of Semiconductor Devices With Heat Flow Trough a Single Path, JESD51-14, Nov. 2010, pp. 1-46.

* cited by examiner

SYSTEM AND METHOD FOR PREDICTING THE TEMPERATURE OF A DEVICE

CROSS-REFERENCE TO RELATED APPLICATIONS

This application claims priority under 35 U.S.C. §119 to Korean Patent Application No. 10-2012-0031819, filed on Mar. 28, 2012, the disclosure of which is incorporated by reference herein in its entirety.

TECHNICAL FIELD

Exemplary embodiments of the inventive concept relate to a system and method of predicting a temperature of a device.

DISCUSSION OF THE RELATED ART

As the size of semiconductor devices becomes smaller, and as processing demands increase, semiconductor devices typically use a higher amount of power. As the amount of power supplied to a semiconductor device increases, the temperature of the semiconductor device also increases. This increase in temperature may cause a deterioration of performance of the semiconductor device.

SUMMARY

Exemplary embodiments of the present inventive concept provide a method of predicting a temperature of a device, which may improve an operational efficiency of the device.

According to an exemplary embodiment, a method of predicting a temperature includes providing a temperature prediction circuit corresponding to a device including a semiconductor chip, establishing a current-voltage correlation of the temperature prediction circuit, and predicting a temperature with respect to power applied to the device using the current-voltage correlation of the temperature prediction circuit.

The temperature prediction circuit may include at least one resistor and/or capacitor, and a plurality of nodes.

The resistance of the resistor and/or the capacitance of the capacitor of the temperature prediction circuit may be set such that the power applied to the device and current applied to the temperature prediction circuit have a linear relation with each other, and a temperature of the device and a voltage measured from the temperature prediction circuit have a linear relation with each other.

The temperature prediction circuit may be provided inside or outside the device, and may be mounted on a substrate with the device.

The temperature prediction circuit may be a Foster type RC network circuit or a Cauer type RC network circuit.

Predicting a temperature with respect to power applied to the device may include collecting data regarding the power applied to the device according to an operation of the device, measuring an amount of a voltage by applying data regarding current corresponding to collected power data to the temperature prediction circuit, and predicting a temperature of the device by converting the amount of a voltage measured from the temperature prediction circuit to a temperature corresponding to the device.

The method may further include adjusting the power applied to the device based on a predicted temperature, after the predicting of a temperature with respect to power applied to the device.

The power may be adjusted such that the predicted temperature does not exceed a critical temperature and an amount of the power applied to the device is at a maximum.

The device may include a substrate, a semiconductor chip mounted on the substrate, a connection member electrically connecting the substrate and the semiconductor chip, and a molding member formed to partially cover the semiconductor chip and the substrate.

According to an exemplary embodiment, a method of predicting a temperature includes measuring a unit step response to time-temperature by applying power to a device including a semiconductor chip, calculating an impulse response of time-temperature to the device, collecting data regarding time-power applied according to an operation of the device, and predicting a temperature according to the operation of the device by convolution integrating collected time-power data and the impulse response of the time-temperature. The data regarding time-power applied according to an operation of the device may be collected once.

A temperature according to the operation of the device may be predicted by measuring an initial temperature of the device before power is applied, and summing a measured initial temperature of the device and a temperature by the convention integration.

The semiconductor chip may be a non-memory chip.

The operation of the device may include booting or execution of an application.

After the predicting of a temperature with respect to power applied to the device, the method may further include adjusting the power applied to the device such that an amount of the power applied to the device is at a maximum based on the predicted temperature and an operational temperature of the device does not exceed a critical temperature, and applying the adjusted power to the device.

The power may be adjusted such that an amount of the power applied before the maximum power is applied to the device is reduced, and the maximum power is applied for a time period during which a temperature of the device does not exceed the critical temperature.

According to an exemplary embodiment, a method of predicting a temperature includes operatively coupling a temperature prediction circuit to a device comprising a semiconductor chip, determining a correlation between a current and a voltage of the temperature prediction circuit, and predicting a temperature with respect to power applied to the device using the determined correlation.

According to an exemplary embodiment, a method of predicting a temperature includes measuring a unit step response to temperature relative to time by applying power to a device comprising a semiconductor chip, calculating an impulse response of temperature relative to time for the device, collecting power data applied according to an operation of the device, and predicting a temperature according to the operation of the device by convolution integrating the collected power data and the impulse response.

According to an exemplary embodiment, a method of predicting a temperature includes operatively coupling a temperature prediction circuit to a device comprising a semiconductor chip, applying a current to the temperature prediction circuit, measuring a voltage at a node of the temperature prediction circuit, wherein the node corresponds to the semiconductor chip of the device, and predicting a temperature of the device based on the current applied to the temperature prediction circuit and the voltage measured at the node of the temperature prediction circuit.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
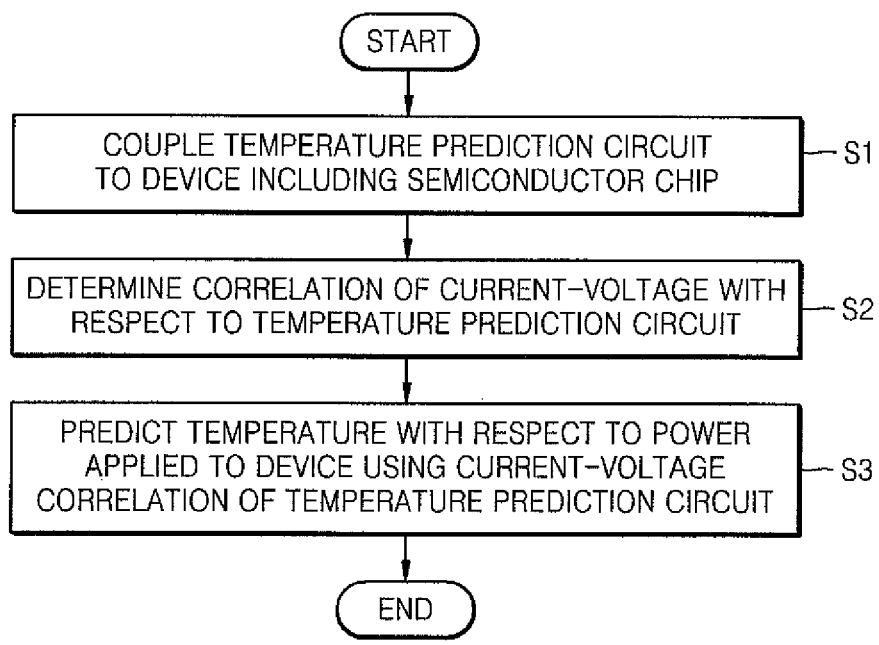
FIG. 1 is a flowchart describing a method of predicting a temperature of a device including a semiconductor chip, according to an exemplary embodiment of the present inventive concept.

Exemplary embodiments of the present inventive concept will be described more fully hereinafter with reference to the accompanying drawings. Like reference numerals may refer to like elements throughout the accompanying drawings.

FIG. 1 is a flowchart describing a method of predicting a temperature of a device including a semiconductor chip, according to an exemplary embodiment of the present inventive concept. Referring to FIG. 1, a mimic circuit (e.g., a temperature prediction circuit) corresponding to a device including at least one semiconductor chip is provided at block S1. The temperature prediction circuit is operatively coupled to the device. At block S2, a correlation between the current and voltage of the temperature prediction circuit is established. At block S3, a temperature with respect to an applied power of the device is predicted using the correlation between the current and voltage of the temperature prediction circuit determined at block S2.

The at least one semiconductor chip of the device may include an integrated circuit therein. For example, the integrated circuit may be a memory circuit or a logic circuit. For example, when the device includes more than one semiconductor chip, some of the semiconductor chips may be memory chips and other semiconductor chips may be non-memory chips. Alternatively, all semiconductor chips in the device may be memory chips, or all semiconductor chips in the device may be non-memory chips.

The device may be, for example, a smartphone. However, exemplary embodiments of the present inventive concept are not limited thereto. For example, the device may be any type of electronic device including at least one semiconductor chip for which temperature may be predicted. That is, the mimic circuit according to exemplary embodiments may be disposed and utilized in a variety of electronic devices.

When the device is a smartphone, the smartphone may include a non-memory chip, which may be, for example, a central processing unit (CPU). When the smartphone is operated to execute a particular application, the CPU may control an input/output operation according to a series of word sequences.

In the above series of processes, a predetermined amount of power is applied to the CPU, and a temperature of the CPU changes according to the amount of applied power. When the temperature of the CPU reaches an allowable maximum temperature (e.g., a critical temperature), as power is applied to the CPU, the amount of applied power may be rapidly reduced to prevent damage to the CPU. This rapid reduction of the applied power may result in the deterioration of CPU performance, and delayed operation of the smartphone.

Thus, if the temperature of the CPU, which changes in response to the power applied in the work sequence during the operation of an application, may be rapidly predicted in advance, deterioration of the performance of the CPU due to the rapid reduction of power may be reduced or prevented, and the operation efficiency of the CPU may be improved.

A temperature of the device may be predicted by applying current to the temperature prediction circuit, rather than directly to the device. The amount of a voltage at a particular node may then be measured.

According to an exemplary embodiment, the temperature prediction circuit may include at least one resistor and/or capacitor, and a plurality of nodes. For example, when a CPU of the device is a dual-core CPU, the temperature prediction circuit may include two or more nodes that can be utilized to predict a temperature of each CPU. For example, a temperature of each CPU may be predicted based on a voltage measured at each node.

The temperature prediction circuit may be designed in accordance with the specification of the Joint Electron Device Engineering Council (JEDEC STANDARD NO. 51-14). The temperature prediction circuit is a circuit corresponding to the device, and may be used to establish the correlation between current and voltage by applying current to the temperature prediction circuit. For example, rather than measuring a temperature of the device by applying power directly to the device, a temperature of the device may be rapidly predicted using the temperature prediction circuit without applying power directly to the device.

For example, the power applied to the device may correspond to the current applied to the temperature prediction circuit. The temperature measured at the device may correspond to the voltage measured at the temperature prediction circuit. The thermal resistance of the device may correspond to the electric resistance of the temperature prediction circuit. However, exemplary embodiments of the present inventive concept are not limited thereto. For example, the power applied to the device may instead correspond to the voltage of the temperature prediction circuit, and the temperature measured at the device may instead correspond to the current of the temperature prediction circuit.

The temperature prediction circuit may be, for example, a mimic circuit including a resistor and/or a capacitor. The temperature prediction circuit may measure a voltage of a particular location by applying current to the temperature prediction circuit. A particular current value applied to the temperature prediction circuit may correspond to the power applied to the device, as described above, and thus, a correlation between current and voltage may be established using the temperature prediction circuit.

According to the correlation established between current and voltage, a temperature of the device during a particular operation of the device may be predicted without applying power directly to the device.

For example, in a series of processes that perform a particular operation of the device, when data regarding the power applied to a CPU of the device relative to time exists, a voltage may be measured by applying current corresponding to the power to the temperature prediction circuit. Further, by converting the measured voltage to a temperature of the device, a temperature according to the process may be rapidly predicted without applying power directly to the device. Different operations that may be performed by the device are described below.

When the device is booted, a voltage may be measured by applying current corresponding to the power that is applied during the booting of the device to a node of the temperature prediction circuit corresponding to a CPU. The measured voltage is converted to a temperature so that a temperature according to the booting operation may be rapidly predicted.

When data is stored, a voltage may be measured by applying current corresponding to power applied during the storing of data to a node of the temperature prediction circuit corresponding to a memory semiconductor chip (e.g., the memory semiconductor chip where the data will be stored). The measured voltage is converted to a temperature so that a temperature according to the storing operation may be rapidly predicted.

When data is erased, a voltage may be measured by applying current corresponding to power applied during the erasing of data to a node of the temperature prediction circuit corresponding to a memory semiconductor chip (e.g., the memory semiconductor chip where data will be erased from). The measured voltage is converted to a temperature so that a temperature according to the erasing operation may be rapidly predicted.

In the above descriptions, a temperature is predicted with respect to a node corresponding to a non-memory chip of the device used during the execution of a particular operation (e.g., booting the device), and with respect to a node corresponding to a memory chip of the device used during particular operations (e.g., storing data in memory of the device and erasing data from memory of the device). However, exemplary embodiments of the present inventive concept are limited thereto. For example, a temperature at a location corresponding to a memory chip of the device may be predicted during the execution of a particular operation, and a temperature at a location corresponding to a non-memory chip of the device may be predicted during data storing/erasing operations.

Figure 2:
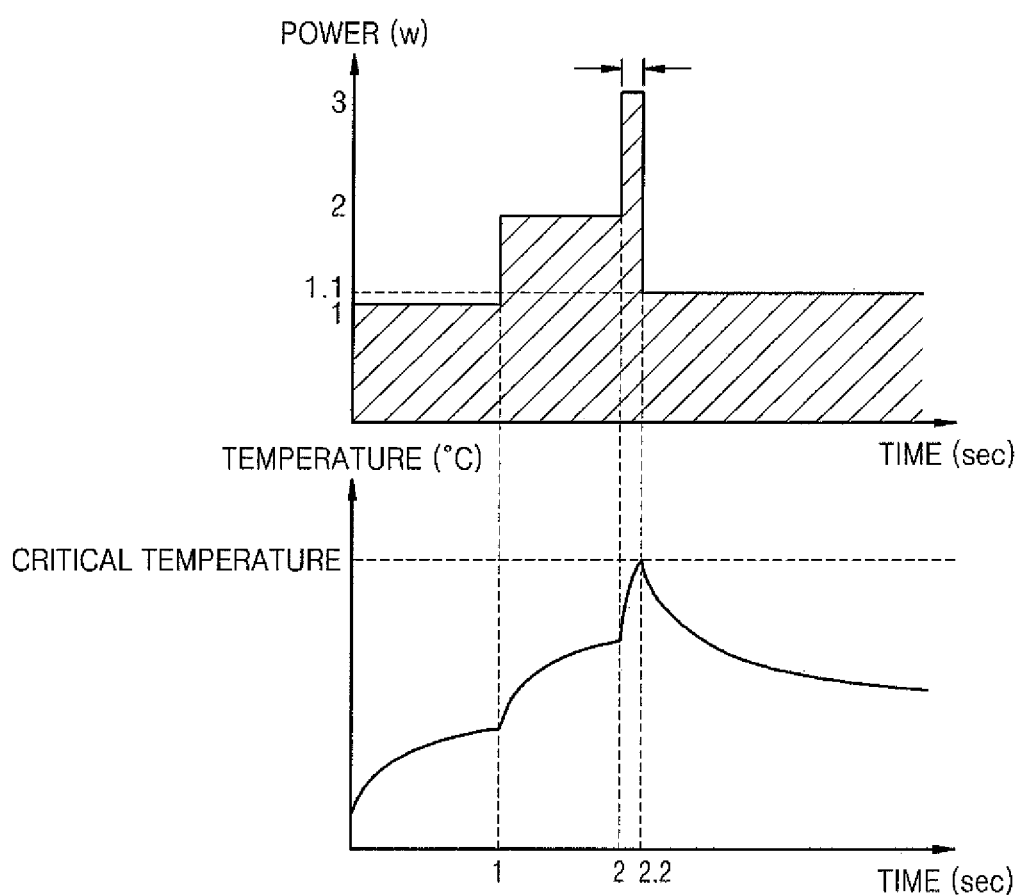
FIG. 2 is a graph showing a temperature of the device predicted according to the application of power, according to an exemplary embodiment of the present inventive concept.
Figure 3:
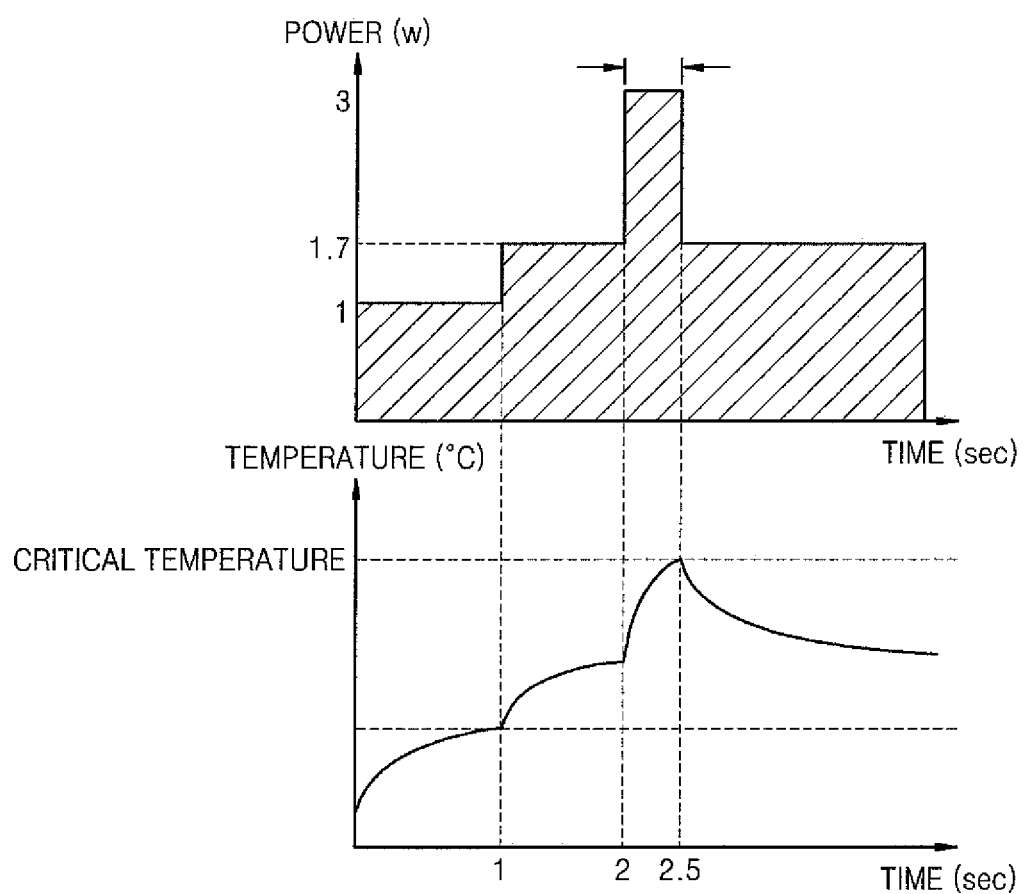
FIG. 3 is a graph showing a temperature predicted by adjusting the amount of power applied to the device, according to an exemplary embodiment of the present inventive concept.

FIG. 2 is a graph showing a temperature of the device predicted according to the application of power, according to an exemplary embodiment of the present inventive concept. FIG. 3 is a graph showing a temperature predicted by adjusting the amount of power applied to the device, according to an exemplary embodiment of the inventive concept.

Referring to FIG. 2, although a value of power applied to the device increases until about t=2.2, where t is measured in seconds, a maximum allowable temperature of the device (e.g., a critical temperature) is reached at about t=2.2. Thus, a value of power applied to the device is sharply reduced from about 2 W to about 1 W. This sharp reduction of applied power occurs because when a temperature of the device exceeds the critical temperature, the device may not properly operate (e.g., errors may occur during the operation of the device). Thus, the applied power is sharply reduced when the critical temperature is reached to reduce or prevent deterioration of performance of the device.

Referring to FIG. 3, when the amount of power applied to the device is adjusted based on the temperature predicted in FIG. 2, a temperature of the device is changed. For example, in FIG. 3, the amount of power applied to the device from about t=1 to about t=2 is reduced from about 2 W to about 1.7 W (with reference to FIG. 2), and the value of power is adjusted to apply a power of about 3 W from about t=2 to about t=2.5. Accordingly, while a temperature increase range is reduced by decreasing the amount of power applied to the device from about t=1 to about t=2, the time during which the power of about 3 W is applied to the device may be increased from about 0.2 seconds to about 0.5 seconds compared to FIG. 2.

Thus, a relatively larger amount of power may be supplied to the device without exceeding a critical temperature based on a result of temperature prediction of FIG. 2. Further, since the time that a maximum amount of power is applied to the device may be extended, the performance of the device may be improved. Further, since the time that a temperature reaches the critical temperature may be predicted, a large value of power, for example, about 1.7 W in FIG. 3, may be applied after the critical temperature is reached, rather than implementing a rapid power reduction. As a result, the device may be more stable, and may be operated more efficiently.

Figure 4:
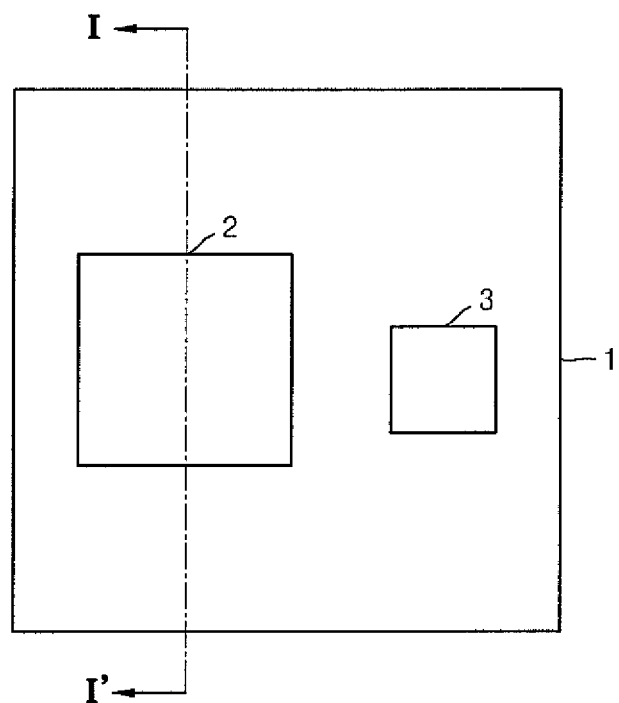
FIG. 4 is a plan view illustrating a substrate including a temperature prediction circuit mounted thereto, according to an exemplary embodiment of the present inventive concept.
Figure 5:
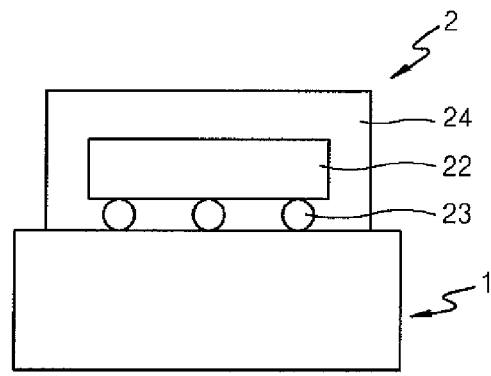
FIG. 5 is a cross-sectional view illustrating a semiconductor package taken along line I-I of FIG. 4, according to an exemplary embodiment of the present inventive concept.

FIG. 4 is a plan view illustrating a substrate 1 including a temperature prediction circuit 3 mounted thereto, according to an exemplary embodiment of the present inventive concept. FIG. 5 is a cross-sectional view illustrating a semiconductor package 2 taken along line I-I of FIG. 4, according to an exemplary embodiment of the present inventive concept.

Referring to FIGS. 4 and 5, the semiconductor package 2 and the temperature prediction circuit 3 may be mounted together on the substrate 1. The semiconductor package 2 may include a semiconductor chip 22 mounted on the substrate 1, a connection terminal 23 electrically connecting the semiconductor chip 22 and the substrate 1, and a molding member 24 that covers the semiconductor chip 22 and the substrate 1. Although FIG. 5 illustrates a semiconductor package 2 having a single semiconductor chip 22, the semiconductor package 2 may include a plurality of semiconductor chips 22 according to exemplary embodiments. The connection terminal 23 may utilize a variety of means including, for example, a ball grid array (BGA).

The semiconductor chip 22 may include an integrated circuit therein, and the integrated circuit may include a memory circuit or a logic circuit. For example, the semiconductor chip 22 may be a memory chip or a non-memory chip. The temperature prediction circuit 3 may be a mimic circuit of the semiconductor package 2, and may be designed in accordance with the JEDEC STANDARD NO. 51-14. However, exemplary embodiments of the present inventive concept are not limited thereto.

Although the temperature prediction circuit 3 is illustrated as being mounted on the substrate 1 and disposed separately from the semiconductor package 2 in FIG. 4, exemplary embodiments of the present inventive concept are not limited thereto. For example, in exemplary embodiments, the temperature prediction circuit 3 may be mounted within the semiconductor package 2.

Figure 6:
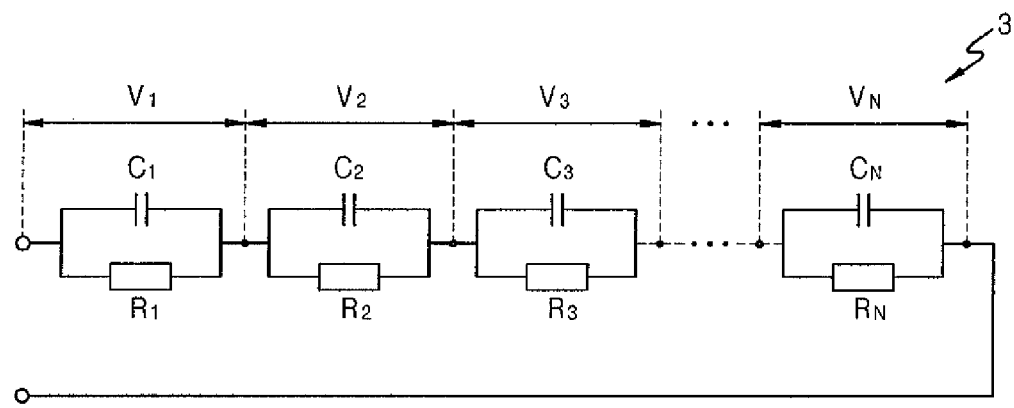
FIGS. 6 and 7 are circuit diagrams illustrating a temperature prediction circuit (e.g., a mimic circuit), according to exemplary embodiments of the present inventive concept.
Figure 7:
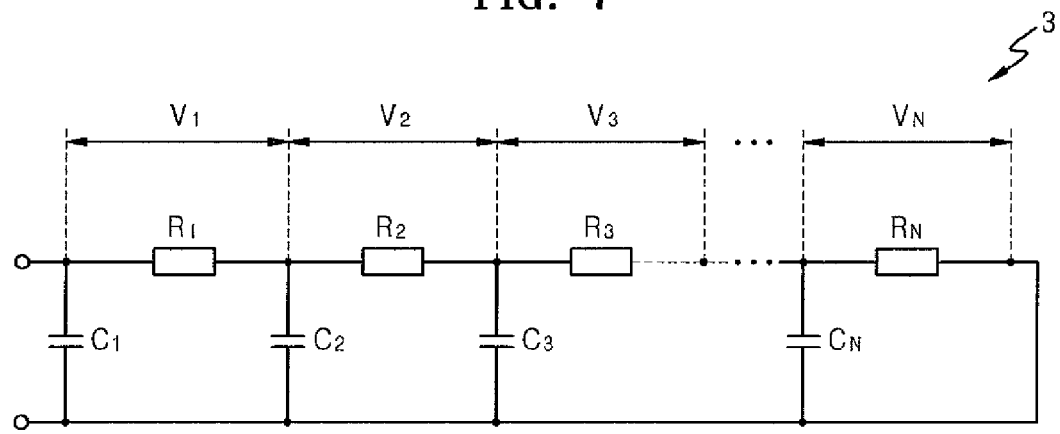

FIGS. 6 and 7 are circuit diagrams illustrating the temperature prediction circuit 3 (e.g., a mimic circuit) of FIG. 4, according to exemplary embodiments of the present inventive concept. For example, the temperature prediction circuit 3 of FIG. 4 may be a network circuit that is obtained by designing an electric circuit equivalent to a thermal structure.

The temperature prediction circuit 3 may be, for example, a Foster type resistor-capacitor (RC) network circuit as shown in FIG. 6, or a Cauer type RC network circuit as shown in FIG. 7. The circuits may be designed in accordance with the JEDEC STANDARD NO. 51-14.

In an exemplary embodiment, the temperature prediction circuit 3 may include a complete network, however, exemplary embodiments of the present inventive concept are not limited thereto.

In FIGS. 6 and 7, resistance values $R_1, R_2, \ldots, R_n$ of the resistors, and capacitance values $C_1, C_2, \ldots, C_n$ of the capacitors may be chosen such that the amount of power applied to the semiconductor package 2 and the amount of current applied to the RC network circuit have a linear relation to each other, and the voltage measured from the RC network circuit and the temperature predicted from the semiconductor package 2 have a linear relation to each other, however, exemplary embodiments are not limited thereto. As shown in FIGS. 6 and 7, the temperature prediction circuit 3 includes a plurality of nodes that can be utilized to predict a temperature of the device. For example, the temperature of the device at different locations may be predicted based on a voltage measured at each node.

For example, when the amount of power applied to the semiconductor package 2 and the amount of current applied to the RC network circuit have a relation such that $I=k_1 \times P + a$, where I is the amount of current applied to the RC network circuit, $k_1$ and a are constants, and P is the amount of power applied to the semiconductor package, the current value may be applied to the RC network circuit by converting the amount of power applied to the semiconductor package 2 to the amount of current applied to the RC network circuit.

Further, when the voltage measured from the RC network circuit and the temperature predicted from the semiconductor package 2 have a relation such that $T=k_2 \times V + b$, where T is the temperature predicted from the semiconductor package 2, $k_2$ and b are constants, and V is the voltage measured from the RC network circuit to which the current is applied, the temperature of the semiconductor package 2 may be predicted by converting the voltage measured from the RC network circuit to a temperature of the semiconductor package 2.

Figure 8:
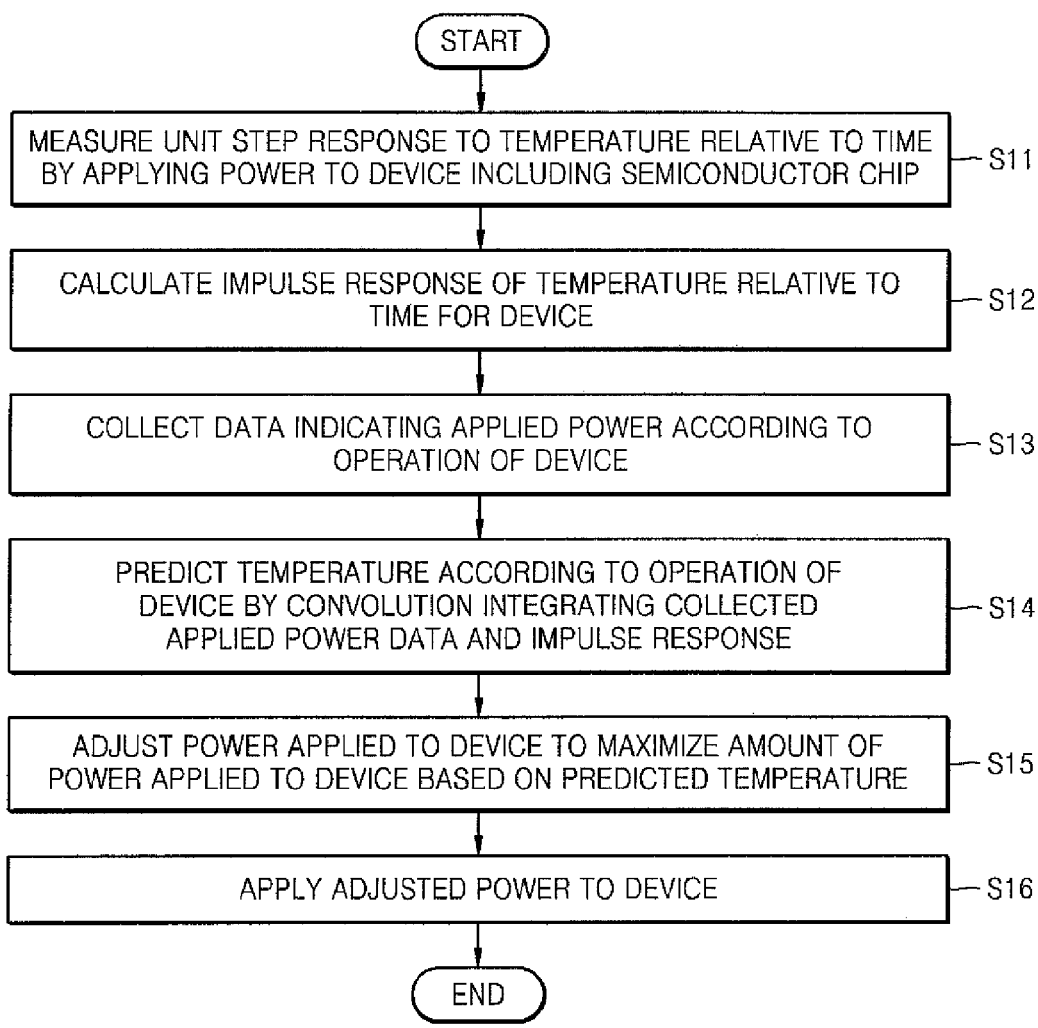
FIG. 8 is a flowchart describing a method of determining power to be applied to a device including a semiconductor chip, according to an exemplary embodiment of the present inventive concept.

FIG. 8 is a flowchart describing a method of determining power to be applied to a device including a semiconductor chip, according to an exemplary embodiment of the present inventive concept. Referring to FIG. 8, the method of determining power to be applied to a device including a semiconductor chip includes measuring a unit step response to temperature relative to time by applying power to the device including a semiconductor chip (block S11), calculating an impulse response of temperature relative to time for the device (block S12), collecting power data applied according to an operation of the device (block S13), and predicting a temperature according to the operation of the device by performing a convolution integral on the collected power data and the impulse response (block S14).

In an exemplary embodiment, the method may further include adjusting power applied to the device to maximize the amount of the power applied to the device based on the predicted temperature (block S15), and applying the adjusted power to the device (block S16). At block S15, the power may be adjusted such that the operational temperature of the device does not exceed a critical temperature.

For example, about 1 W of power may be applied to the device to measure the unit step response to the temperature of the device relative to time (block S11). A temperature curve that gradually increases as time passes (e.g., the unit step response) may be measured with respect to the applied 1 W of power (block S11).

An impulse response may be calculated by differentiating the measured unit step response to time (block S12). For example, when the device is a CPU, the CPU may perform a booting operation of a smartphone or a computer, or an operation that executes a particular application. A CPU is an example of the device, and exemplary embodiments of the present inventive concept are not limited thereto.

During the process of booting the device or executing a particular application, power is applied to the CPU. The applied power may vary according to time. As the power applied to the CPU increases, performance of the CPU is improved. However, when a temperature of the CPU rises beyond a critical temperature, performance of the CPU may deteriorate. Thus, the performance and critical temperature of the CPU are taken into account when applying power to the CPU.

Data indicating the power applied to the CPU according to the operation of the CPU is collected at block S13. This data may be collected once. Although execution of a particular application is described herein as an exemplary operation of the CPU, exemplary embodiments of the present inventive concept are not limited thereto.

When a particular application is executed, a temperature difference of the CPU according to time may be measured by convolution integrating a time-power graph applied to the collected CPU and the impulse response.

A temperature of the CPU according to the applied power may be predicted by measuring an initial temperature of the CPU before the power is applied, and summing the measured initial temperature of the CPU and the temperature difference measured through the performed convolution integration.

As described above, as the amount of power applied to the CPU increases, the operational performance of the CPU is improved. However, when a temperature of the CPU rises to exceed the critical temperature, performance of the CPU may be degraded (e.g., errors or a decrease in speed may occur).

Thus, to maximize the amount of power applied to the CPU while maintaining the operational temperature of the CPU such that it does not exceed the critical temperature, the power applied to the CPU may be adjusted based on the measured temperature of the CPU.

Figure 9:
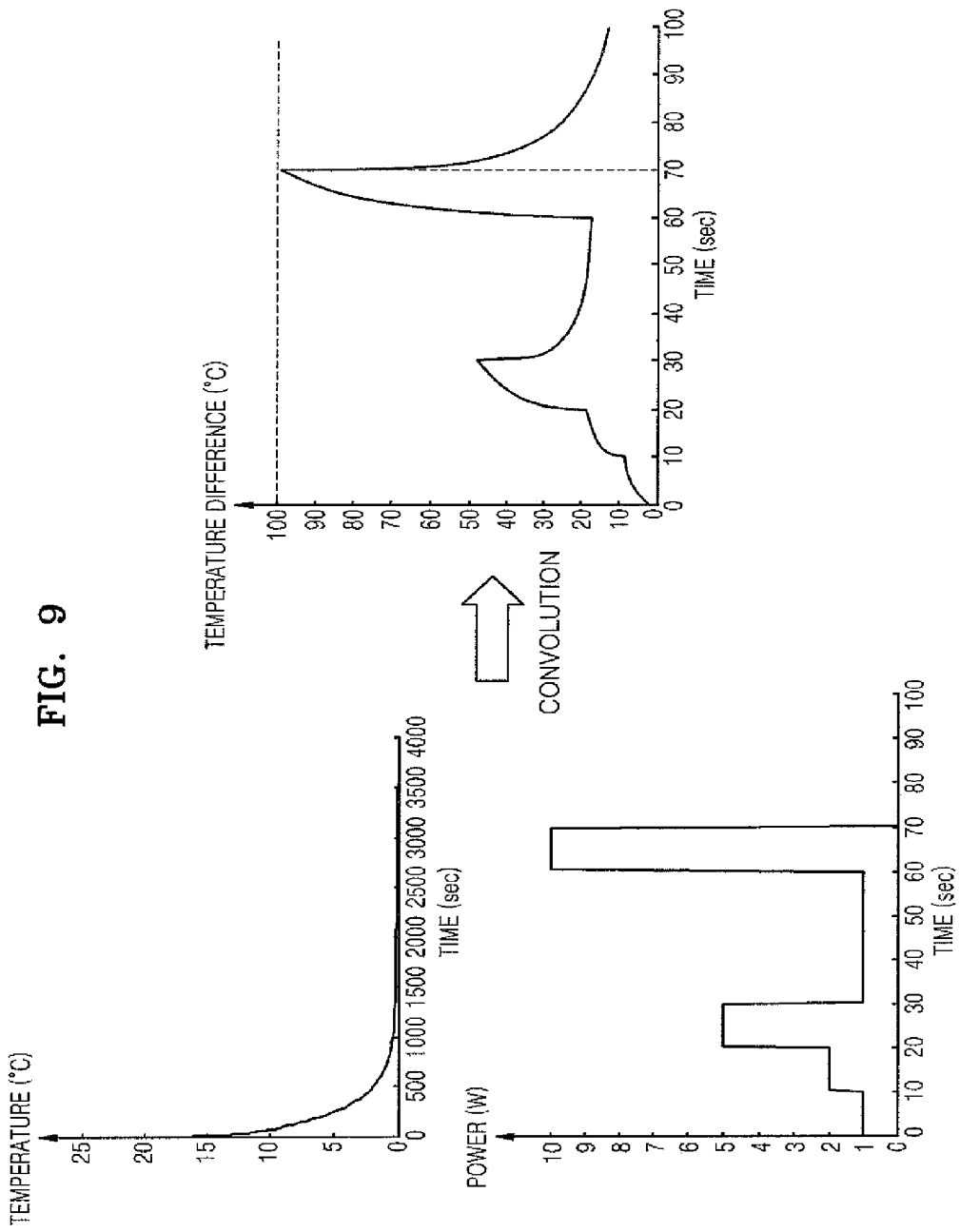
FIG. 9 is a graph showing a temperature difference of a CPU predicted by convolution integrating time-power data collected while the CPU performs a particular operation and an impulse response calculated at block S12 of FIG. 8, according to an exemplary embodiment of the present inventive concept.

FIG. 9 is a graph showing a temperature difference of a CPU predicted by convolution integrating time-power data collected while the CPU performs a particular operation and an impulse response calculated at block S12 of FIG. 8. When the measured initial temperature of the CPU before power is applied to the CPU is about 30° C. and a critical temperature of the CPU is about 130° C., a temperature of the CPU at about t=70 is predicted at about 130° C. Further, power applied to the CPU after about t=70 is about 0 W, resulting in the temperature of the CPU not exceeding the critical temperature.

The maximum power applied to the CPU is about 10 W. For example, about 1 W of power is applied to the CPU from about t=30 to about t=60 before the maximum power is applied. The temperature immediately before the maximum power of about 10 W is applied to the CPU (e.g., at about t=60) corresponds to about 50° C.

Thus, the amount of the power applied to the CPU from about t=30 to about t 60 may be adjusted to be less than about 1 W when maximizing the amount of power applied to the CPU without exceeding the critical temperature of about 130° C. However, exemplary embodiments of the present inventive concept are not limited thereto, and an interval at which power is adjusted may vary according to the type and execution time of an application.

For example, when about 0.8 W of power is applied to the CPU from about t=30 to about t=60, a temperature of the CPU at about t=60 may be predicted, and thus, the maximum power of about 10 W may be applied to the CPU for a time period during which the CPU does not exceed the critical temperature based on the predicted temperature. Thus, since the time for applying the maximum power may be increased within a range not exceeding the critical temperature while increasing the amount of power applied to the CPU, the performance of the CPU may be improved, and deterioration of the performance of the CPU may be reduced or prevented.

In the exemplary embodiments described above, the time for applying the maximum power is increased by reducing the amount of power applied to the CPU immediately before the maximum power is applied. However, exemplary embodiments of the present inventive concept are not limited thereto. For example, a user may determine whether to adjust the amount of power applied to the CPU through iteration by adjusting power at a desired time point, predicting a temperature by convolution integrating the adjusted power and the impulse response of FIG. 9, re-adjusting the power, or performing convolution integration of the re-adjusted power and the impulse response.

Thus, the maximum allowable power may be maintained at the CPU as long as possible, resulting in improved performance of the CPU. Further, since the application of power is adjusted to maintain a temperature of the CPU such that the temperature does not exceed the critical temperature, stability of the CPU may be improved. In the exemplary embodiments described above, the applied power is adjusted in a direction to maintain the maximum allowable power for as long as possible. However, exemplary embodiments of the present inventive concept are not limited thereto. For example, the power may be adjusted to have the maximum power amount while the maximum allowable power is reduced according to the operational purpose and type of the CPU.

Figure 10:
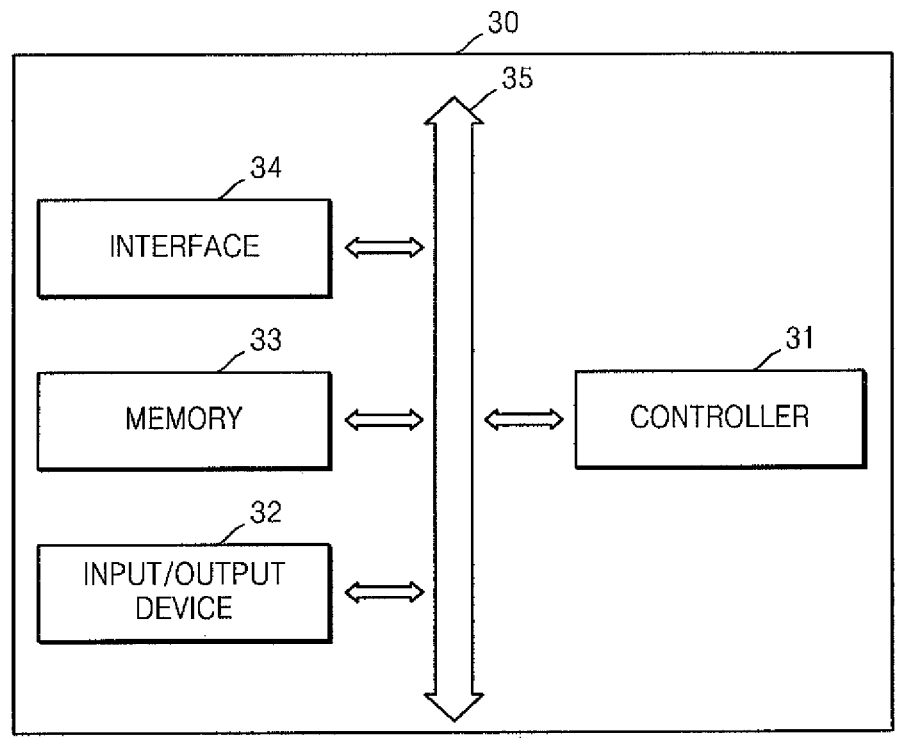
FIG. 10 illustrates a system including a temperature prediction circuit, according to an exemplary embodiment of the present inventive concept.

FIG. 10 illustrates a system 30 including a temperature prediction circuit, according to an exemplary embodiment of the present inventive concept. Referring to FIG. 10, the system 30 may include a controller 31, an input/output device 32, a memory 33, and an interface 34. The system 30 may be, for example, a mobile system or a system for transmitting or receiving information. The mobile system may be, for example, a personal digital assistant (PDA), portable computer, computer tablet, wireless phone, mobile phone, digital music player, or memory card.

The controller 31 may execute a program and control the system 30. The controller 31 may include, for example, a microprocessor, digital signal processor, or microcontroller. The controller 31 may further include a temperature prediction circuit according to an exemplary embodiment of the present inventive concept. A temperature of the controller 31 may be predicted by the temperature prediction method according to an exemplary embodiment of the present inventive concept.

The input/output device 32 may be used to input or output data of the system 30. The system 30 may be connected to an external apparatus such as, for example, a personal computer or a network, so as to exchange data with each other. The input/output device 32 may be, for example, a keypad, keyboard, or display.

The memory 33 may store code and/or data for operation of the controller 31, and/or data processed by the controller 31. The memory 33 may include a temperature prediction circuit according to an exemplary embodiment of the present inventive concept. A temperature of the memory 33 may be predicted by the temperature prediction method according to an exemplary embodiment of the present inventive concept.

The interface 34 may provide a data transmission path between the system 30 and an external apparatus. The controller 31, the input/output device 32, the memory 33, and the interface 34 may communicate with one another via a bus 35. The system 30 may be, for example, a mobile phone, MP3 player, navigation device, portable multimedia player (PMP), solid state disks (SSD), or household appliance.

Figure 11:
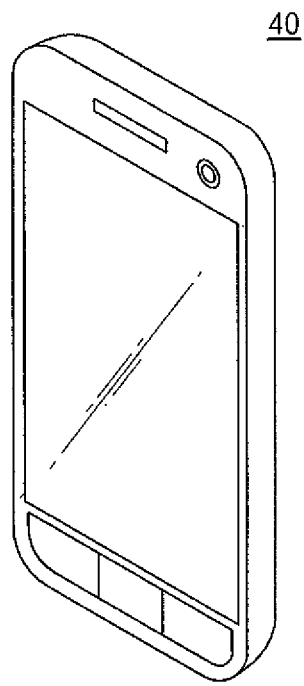
FIG. 11 is a perspective view of an electronic apparatus employing a device manufactured according to an exemplary embodiment of the present inventive concept.

FIG. 11 is a perspective view of an electronic apparatus employing a device manufactured according to an exemplary embodiment of the present inventive concept. For example, in FIG. 11, the system 30 of FIG. 10 is implemented as a mobile phone 40.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of predicting a temperature, comprising:
   operatively coupling a temperature prediction circuit to a device comprising a semiconductor chip;
   determining a correlation between a current and a voltage of the temperature prediction circuit;
   predicting a temperature of the device with respect to power applied to the device using the determined correlation; and
   maintaining an operational temperature of the device such that the operational temperature does not exceed a critical temperature by adjusting the power applied to the device based on the predicted temperature,
   wherein the temperature prediction circuit comprises at least one resistor and at least one capacitor, and a plurality of nodes,
   wherein a resistance of the resistor and a capacitance of the capacitor each comprise a value such that the power applied to the device and current applied to the temperature prediction circuit have a substantially linear relation with each other, and a temperature of the device and a voltage measured at the temperature prediction circuit have a substantially linear relation with each other.

2. The method of claim 1, wherein the temperature prediction circuit and the device are mounted on a substrate, the device is included in a semiconductor package, and the temperature prediction circuit is disposed within the semiconductor package or outside of the semiconductor package.

3. The method of claim 1, wherein the temperature prediction circuit is a Foster type resistor-capacitor (RC) network circuit or a Cauer type RC network circuit.

4. The method of claim 1, wherein predicting the temperature comprises:
collecting data indicating an amount of the power applied to the device according to an operation of the device;
measuring an amount of a voltage at the temperature prediction circuit by applying a current to the temperature prediction circuit based on the collected data; and
predicting a temperature of the device by converting the measured amount of voltage to a temperature corresponding to the device.

5. The method of claim 1, wherein the power applied to the device is adjusted to a maximum power value that does not exceed the critical temperature.

6. The method of claim 1, wherein the device comprises:
a substrate;
the semiconductor chip mounted on the substrate;
a connection member electrically connecting the substrate and the semiconductor chip; and
a molding member covering the semiconductor chip and the substrate.

7. A method of predicting a temperature, comprising:
operatively coupling a temperature prediction circuit to a device comprising a semiconductor chip;
determining a correlation between a current and a voltage of the temperature prediction circuit;
predicting a temperature of the device with respect to power applied to the device using the determined correlation; and
maintaining an operational temperature of the device such that the operational temperature does not exceed a critical temperature by adjusting the power applied to the device based on the predicted temperature,
wherein predicting the temperature comprises:
collecting data indicating an amount of the power applied to the device according to an operation of the device;
measuring an amount of a voltage at the temperature prediction circuit by applying a current to the temperature prediction circuit based on the collected data; and
predicting a temperature of the device by converting the measured amount of voltage to a temperature corresponding to the device.

8. The method of claim 7, wherein the temperature prediction circuit and the device are mounted on a substrate, the device is included in a semiconductor package, and the temperature prediction circuit is disposed within the semiconductor package or outside of the semiconductor package.

9. The method of claim 7, wherein the temperature prediction circuit is a Foster type resistor-capacitor (RC) network circuit or a Cauer type RC network circuit.

10. The method of claim 7, wherein the power applied to the device is adjusted to a maximum power value that does not exceed the critical temperature.

11. The method of claim 7, wherein the device comprises:
a substrate;
the semiconductor chip mounted on the substrate;
a connection member electrically connecting the substrate and the semiconductor chip; and
a molding member covering the semiconductor chip and the substrate.

12. The method of claim 7, wherein the temperature prediction circuit comprises at least one resistor and at least one capacitor, and a plurality of nodes.

13. The method of claim 12, wherein a resistance of the resistor and a capacitance of the capacitor each comprise a value such that the power applied to the device and current applied to the temperature prediction circuit have a substantially linear relation with each other, and a temperature of the device and a voltage measured at the temperature prediction circuit have a substantially linear relation with each other.

* * * * *